(No Model.)  3 Sheets—Sheet 1.

C. LA DOW.
HARROW.

No. 501,841. Patented July 18, 1893.

Witnesses.
Sidney P. Hollingsworth
Baltus DeLong

Inventor.
CHARLES LA DOW
by his attorneys
Baldwin, Davidson & Wight

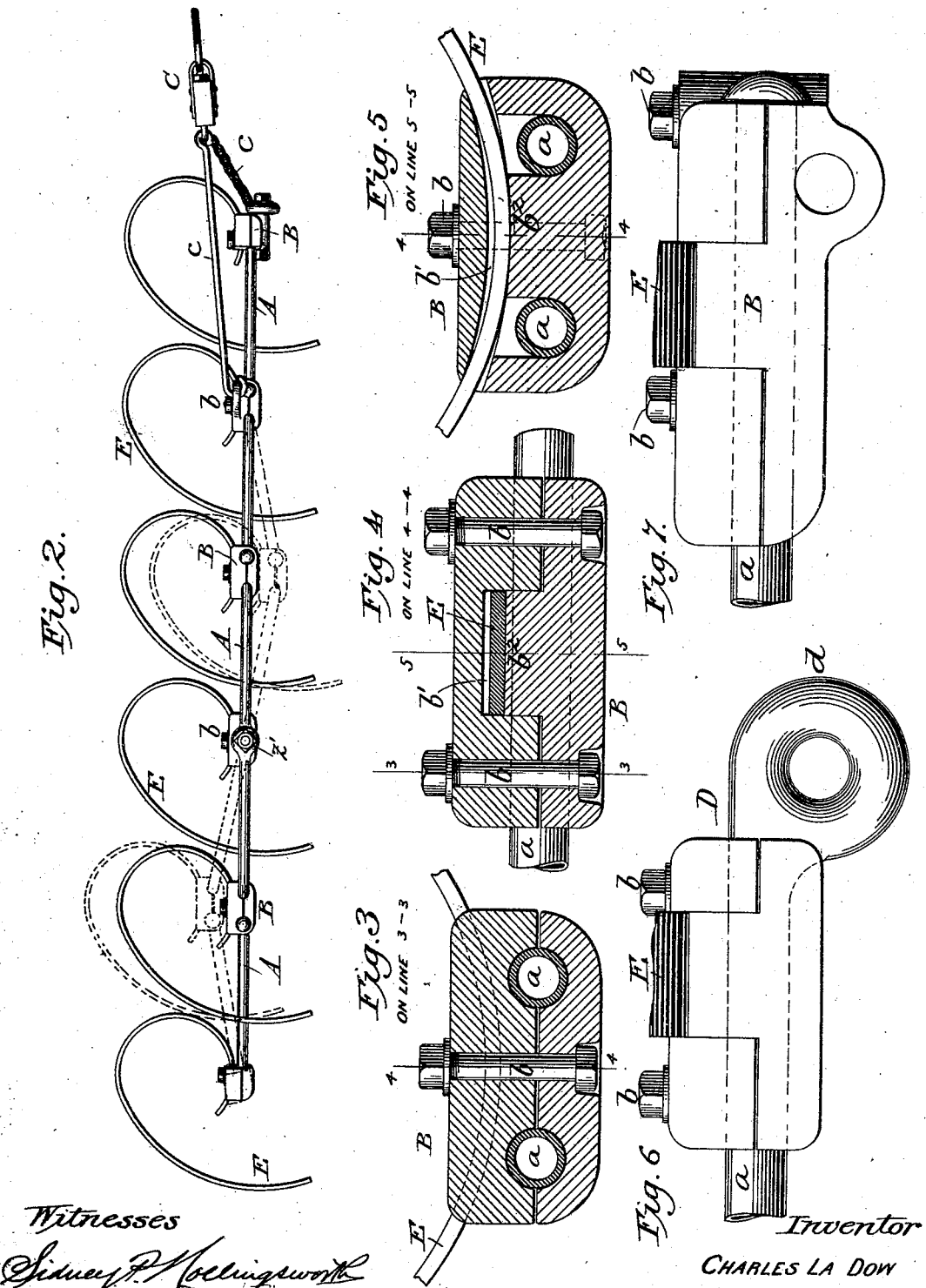

(No Model.) C. LA DOW. HARROW.

No. 501,841. Patented July 18, 1893.

3 Sheets—Sheet 3.

Witnesses
Sidney P. Hollingsworth
Baltus DeLong

Inventor
CHARLES LA DOW
by his attorneys
Baldwin, Davidson & Wight

UNITED STATES PATENT OFFICE.

CHARLES LA DOW, OF ALBANY, NEW YORK.

HARROW.

SPECIFICATION forming part of Letters Patent No. 501,841, dated July 18, 1893.

Application filed April 11, 1891. Serial No. 388,617. (No model.)

*To all whom it may concern:*

Be it known that I, CHARLES LA DOW, a citizen of the United States, residing at Albany, in the county of Albany and State of New York, have invented certain new and useful Improvements in Harrows, of which the following is a specification.

My invention relates to harrows in which spring teeth are secured to zig-zag staggered or bent bars, of which the frame is constructed. By my invention, the frame is constructed in a novel manner by which it is enabled to perform work which could not be accomplished in harrows heretofore made.

In accordance with my invention, the harrow frame is made flexible, so that one portion of the frame may have movement relatively to other parts of the frame. Couplings are employed which serve not only to hold the teeth adjustably and securely in their seats, but also to connect the frame bars together at their adjacent parallel portions in such manner that the tooth and its coupling may work freely relatively to the frame, but is prevented from lateral movement by the angles or bends of the frame bars.

Figure 1:
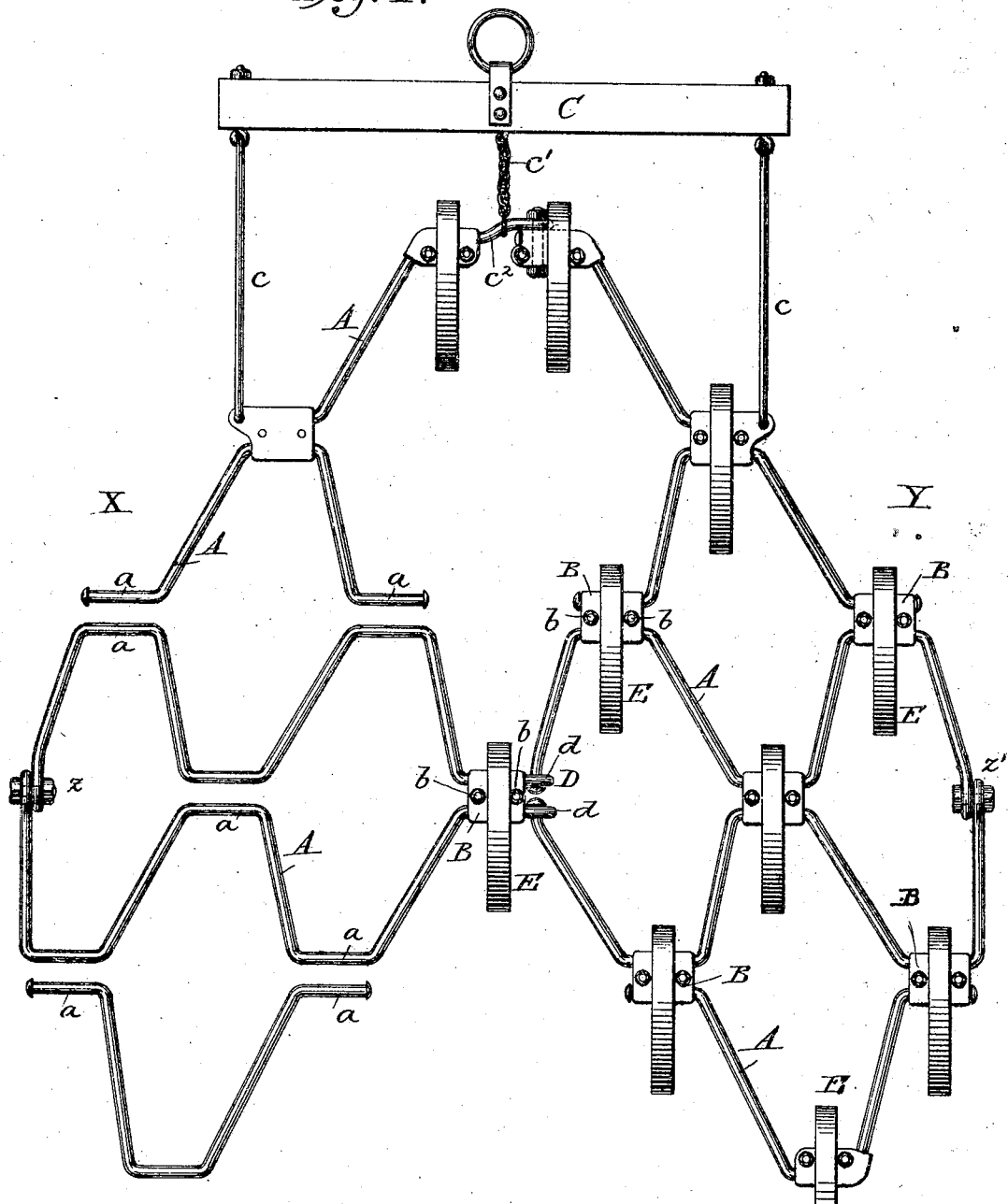
Figure 8:
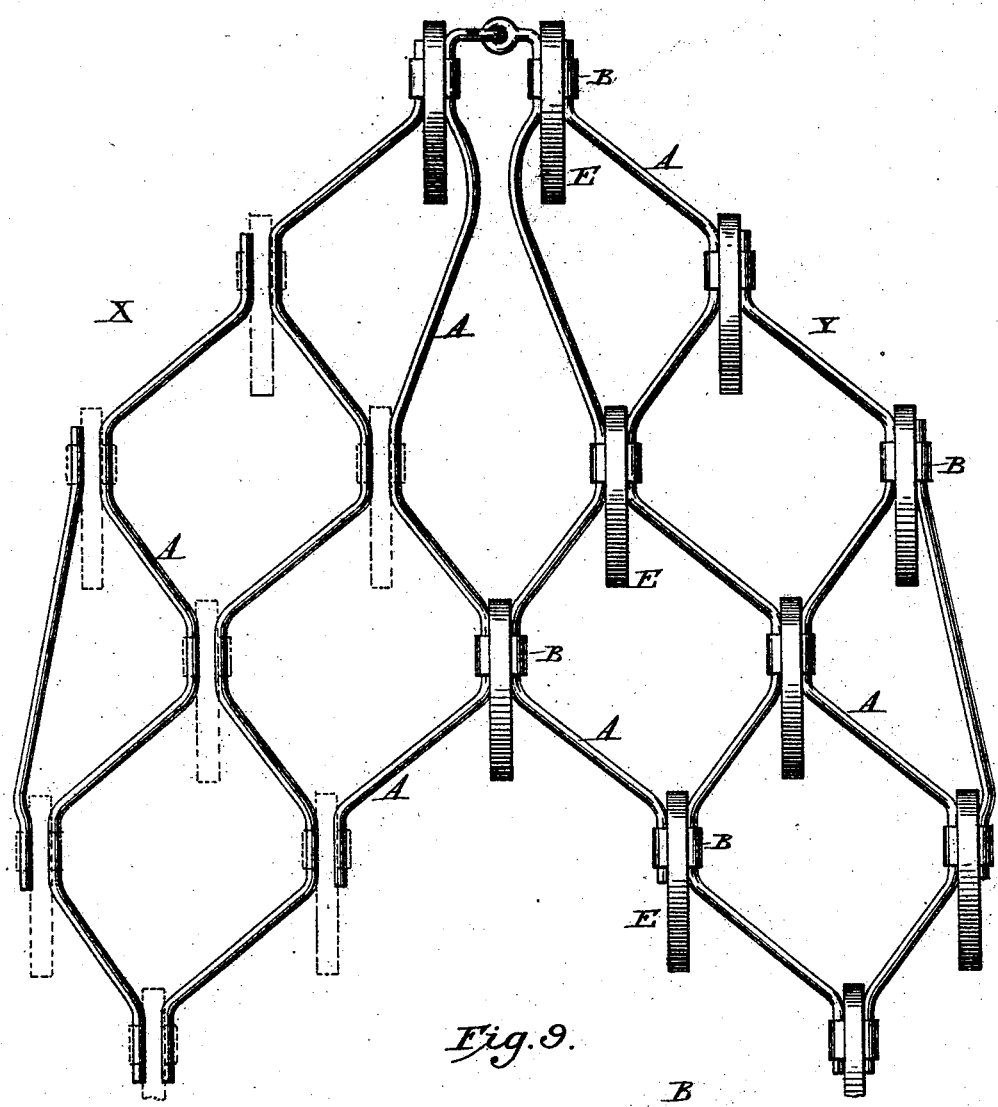
Figure 9:
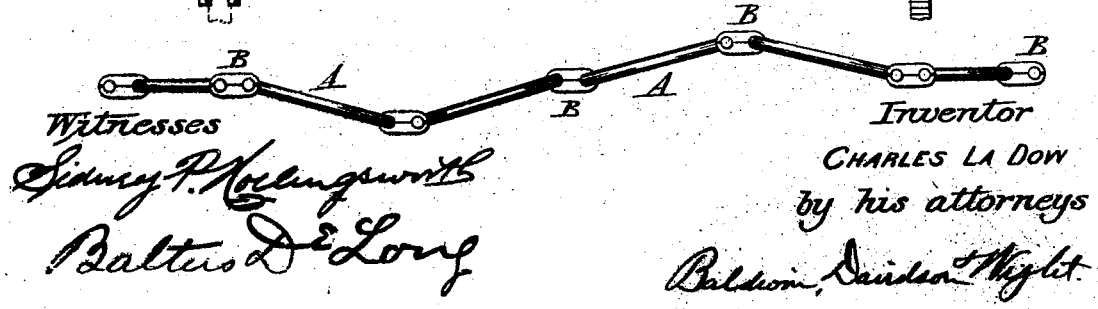

In the accompanying drawings,—Figure 1 represents a top view of my improvements, with the teeth removed from one section of the frame. Fig. 2 is a side view thereof, showing by dotted lines how the teeth may vibrate up and down independently to follow inequalities of the surface. Fig. 3 is a detail view in section on the line 3—3 of Fig. 4, illustrating the manner of connecting the frame bars and teeth. Fig. 4 is a section on the line 4—4 of Fig. 5. Fig. 5 is a section on the line 5—5 of Fig. 4. Fig. 6 is a detail view of a modified form of coupling for connecting the two sections of the harrow at the rear. Fig. 7 is a view of the coupling employed on one side of the harrow for connecting the sections at the front. Figs. from 3 to 7 inclusive are on an enlarged scale. Fig. 8 is a plan view of a modified form of harrow frame. Fig. 9 is a rear view of the frame with the teeth removed. Figs. 1 to 7, inclusive, all illustrate parts of the same harrow, while Figs. 8 and 9 illustrate a modification.

Referring first to the harrow shown in plan in Fig. 1, it will be seen that the frame is composed of zig-zag staggered or bent bars A, in this instance arranged transversely to the line of draft, with lateral portions $a$, in different bars adjacent and parallel to corresponding lateral portions in other bars. Couplings B, are employed for uniting the frame bars at the parallel portions $a$, and these couplings are so arranged as to extend from one end of the lateral portions to the other and bear against the inclined portions so that they are prevented from moving sidewise. The precise form of coupling is not important, it being desirable only that the couplings should be so formed as to permit some of the frame bars to move relatively to other frame bars to allow the teeth, which are secured to the couplings, to have movements relatively to their frame.

The harrow frame is shown as formed in two sections X and Y, connected at the front to the whiffle-tree C, by draft links $c$, and a central connection or chain $c'$. At the front the two sections of the harrow are connected by a bar $c^2$, which is connected to one section loosely to permit of its hinge movement relatively to its fellow section. The two sections at the rear end of the harrow are connected by a coupling D, illustrated in Fig. 6, which, it will be seen, is flexible, the eyes $d$, being adapted to receive the headed ends of the frame bars and form a hinge between the sections.

The harrow teeth E, which, as shown, are of the Garver type, are located in the frame wherever the parallel portions $a$, occur. At the points $z\ z'$, there are no teeth, but the frame bars are connected by hinge bolts. The frame bars may be solid or hollow; they are preferably circular in cross section at all points, but not necessarily so, as the parallel portions may be rounded, or hinged together in other ways while the other parts may be of a different cross section.

The coupling B, shown particularly in Figs. 3 to 5 inclusive, is formed in two parts united by vertical bolts $b$, and provided at their inner ends with rounded recesses to receive the frame bars. The upper coupling block is provided with a recess $b'$, to receive the upper curved end of the tooth, and the lower block is provided with a tooth seat $b^2$, which bears against the convex side of the tooth. When the tooth and coupling sections are in position, and the bolts are tightened, the tooth will be firmly held in its seat, its concave side resting against the upper coupling block at two points, so that the spring tension of the tooth is utilized for securely holding the different parts in position when once adjusted.

As before stated, the form of coupling may be varied, it being desirable only that the couplings should serve to hinge or pivot parallel portions of different frame bars together and also to connect the teeth thereto. The two sections of the couplings are so arranged that they do not grip the frame bars tightly, but permit them to have movement relatively to other frame bars.

Instead of arranging the parallel portions of the frame bars transversely to the line of draft, I may arrange them in line with the draft as shown in Fig. 8, and the couplings are suitably modified to accommodate this change. In either construction, the frame bars may work loosely relatively to their couplings, enabling the harrow teeth to move relatively to their frame.

So far as I am aware, I am the first to hinge bars together by their adjacent parallel portions in such manner as to form a harrow frame whose bars may have movement relatively to other bars at the several tooth bearing parts of the frame. I do not, therefore, limit myself to any particular form of coupling, nor to the precise arrangement of frame bars illustrated, but

I claim as my invention—

1. A harrow frame composed of tooth-bearing bars having adjacent portions attached by hinge connections in combination with teeth mounted at the hinge connections, substantially as described.

2. A harrow frame composed of zig-zag bars having adjacent parallel portions hinged together.

3. A harrow frame having zig-zag bars hinged together by parallel adjacent portions, in combination with teeth mounted on couplings to which the frame bars are hinged.

4. A harrow composed of zig-zag frame bars, couplings for hinging together adjacent parallel portions of different bars, at the several tooth bearing portions of the frame and teeth secured to the couplings.

5. A harrow frame comprising a series of bars with openings substantially diamond-shaped between them, and having adjacent portions connected together by hinges, in combination with spring harrow teeth secured to the bars at their hinge connection.

6. The combination with a series of bars hinged together at their adjacent angles, in combination with curved or C-shaped harrow teeth connected to the bars at their angles, substantially as described.

In testimony whereof I have hereunto subscribed my name.

CHARLES LA DOW.

Witnesses:
LLOYD B. WIGHT,
BALTUS DE LONG.